_United States Patent Office_

3,240,844
Patented Mar. 15, 1966

3,240,844
DIENE ELASTOMERS CURED WITH MERCAPTO-
TERMINATED LIQUID DIENE POLYMER
Jerry T. Gruver, Bartlesville, Okla., assignor to Phillips
Petroleum Company, a corporation of Delaware
No Drawing. Filed Mar. 12, 1962, Ser. No. 179,199
6 Claims. (Cl. 260—894)

This invention relates to a cured diene polymer. In one aspect, the invention relates to a method for curing diene polymers.

The development of the rubber industry stems from the original discovery of the vulcanization of natural rubber and over the years numerous compounding recipes have been developed to meet the requirements of the growing number of applications for cured rubbers. With the advent of an increasing variety of synthetic rubbers and uses therefore, the compounding art has become more and more complex and new systems for effecting the cure of these rubbers comprise valuable contributions to the art.

Among the various methods developed for the compounding and curing of rubber is that of adding thereto a compound which decomposes thermally to form free radicals at the curing temperature employed. These free radical generators have been found to be fairly effective for some uses and for some rubbers. Compounding recipes using these materials are simplified because many of the ingredients previously regarded as essential are not used. However, in many instances, cures so obtained are not satisfactory either in rate or effectiveness.

It is an object of this invention to provide a novel cured diene polymer.

It is another object of the invention to provide a method for curing a diene polymer.

It is another object of this invention to provide a novel method for the curing of a diene polymer containing a free radical generating agent.

These and other objects and advantages of the invention will be apparent to one skilled in the art upon reading the accompanying disclosure.

These objects are broadly accomplished by a novel composition comprising a vulcanizable mixture comprising, prior to vulcanization, a vulcanizable elastomer containing vinyl unsaturation, a free radical generating agent, and a polythiol having the structural formula $R(SH)_x$ wherein R is an alkylene, cycloalkylene, arylene, polyalkenylene or alkenylene group and $x$ is an integer from 2 to 6.

In one aspect of the invention, the above recited novel composition is prepared by intimately admixing said vulcanizable elastomer containing vinyl unsaturation, free radical generating agent and polythiol and subjecting said admixture to curing conditions.

The polythiols employable in the composition and process of this invention are preferably mercapto-terminated liquid polymers of conjugated dienes. When the diene polymer has a simple linear structure, the mercapto-terminated compound is a dithiol. In those instances when the diene polymer has a radial structure, i.e., three or more linear polymer chains emanating from a single point, two or more such chains are terminated by mercapto-groups.

The mercapto-terminated liquid polymers of conjugated dienes employable herein may be prepared by any known method. Suitable methods are described and claimed in the copending application of Carl A. Uraneck et al., Serial No. 772,167, filed November 6, 1958, and now U.S. Patent No. 3,135,716, and R. J. Sonnenfeld and Carl A. Uraneck, Serial No. 61,362, filed October 10, 1960, and now abandoned. These materials are prepared by polymerizing polymerizable monomers to liquid polymers which contain reactive groups at the end of the polymer chain and double bonds within the polymer chain. In general, the monomers employable for the preparation of the vulcanizable elastomers are selected from the same group as those employed for the preparation of the mercapto-terminated liquid polymers.

The terminally reactive polymers in addition to including homopolymers and copolymers of the above materials also include block copolymers, which are formed by polymerizing a monomer onto the end of a polymer, the monomer being introduced in such a manner that substantially all of the coreacting molecules enter the polymer chain at this point. In general, the block copolymers can include combinations of blocks formed from a single monomer and blocks formed from two or more monomers.

In one suitable method the terminally reactive polymers are prepared by contacting the monomer or monomers which it is desired to polymerize with an organo polyalkali metal compound. The organo polyalkali metal compounds preferably contain from 2 to 4 alkali metal atoms, and those containing 2 alkali metal atoms are more often employed, with lithium being the preferred alkali metal.

The organo polyalkali metal compounds can be prepared in several ways, for example, by replacing halogens in an organic halide with alkali metals, by direct addition of alkali metals to a double bond, or by reacting an organic halide with a suitable alkali metal compound.

Formation of the terminally reactive polymers is generally carried out in the range of between —100 and +150° C., preferably between —75 and +75° C. The particular temperatures employed will depend on both the monomers and the initiators used in preparing the polymers. For example, it has been found that the organolithium initiators provide more favorable results at elevated temperatures whereas lower temperatures are required to effectively initiate polymerization to the desired products with the other alkali metal compounds. The amount of catalyst employed can vary but is preferably in the range of between about 1 and about 30 millimoles per 100 grams of monomers. It is preferred that the polymerization be carried out in the presence of a suitable diluent, such as benzene, toluene, cyclohexane, methylcyclohexane, xylene, n-butane, n-hexane, n-heptane, isooctane, and the like. Generally, the diluent is selected from hydrocarbons, e.g., paraffins, cycloparaffins, and aromatics containing from 4 to 10 carbon atoms per molecule.

The terminally reactive polymers prepared as hereinbefore described contain an alkali metal atom on each end of the polymer chain and the organic radical of the initiator is present in the polymer chain. These terminally reactive polymers can be treated with reagents to introduce various reactive groups in place of the alkali metal atoms.

Particularly preferred for this invention are the dimercapto-polymers of the conjugated dienes such as dimercaptopolybutadiene. The following equation represents an example of a specific method which can be employed to introduce reactive groups. In these equations, P designates a polymer chain.

Li—P—Li + 2S → Li—S—P—S—Li
Li—S—P—S—Li + 2H₂O → HS—P—SH + 2LiOH

Other compounds useful in the invention include polythiols of the type $R(SH)_x$ wherein R is an alkylene, cycloalkylene, alkenylene, or an arylene group and $x$ is an integer from 2 to 6, preferably 2. Useful materials within this group include 1,2-dimercaptoethane, 1,4-dimercaptobutane, 1,8-dimercaptooctane, 1,10-dimercaptodecane, 1,4-dimercaptobenzene, 1,20-dimercaptoeicosane, 1,4-dimercaptocyclohexane, 1,8-dimercapto-4-octene, 1,16-dimercapto-7-hexadecene, 1,3,5-trimercaptobenzene, 1,3,5,7,10-penta-mercaptodecane, 1,4,8,10,14,20 - hexamercaptoeicosane and the like.

The vulcanizable elastomers employed as the "base" material in this invention can be prepared by any suitable method such as by emulsion polymerization.

The monomers which can be employed in the preparation of the vulcanizable elastomers and the mercapto-terminated polymers include the conjugated dienes, preferably those containing from 4 to 12 carbon atoms and more preferably those containing from 4 to 8 carbon atoms. Illustrative examples of suitable conjugated dienes are 1,3-butadiene, isoprene, piperylene, methylpentadiene, 2,3-dimethyl-1,3-butadiene, 1-phenylbutadiene, 3,4-dimethyl-1,3-hexadiene, 4,5-diethyl-1,3-octadiene, etc. In addition, conjugated dienes containing other substituents can also be employed, such as for example, halogenated dienes, such as chloroprene, etc., 2-cyanobutadiene, 2-methoxybutadiene, and the like. Of the conjugated dienes, the preferred material is butadiene, with isoprene and piperylene also being especially suitable. Especially preferred polymers are the polybutadienes containing a high percentage of cis-configuration. In addition to homopolymers of conjugated dienes the polymers of the invention also include copolymers, including block copolymers, of conjugated dienes with copolymerizable vinylidene monomers. Comonomers which can be employed are aryl-substituted olefins such as styrene, various alkyl styrenes, paramethoxystyrene, vinylnaphthalene, and the like; heterocyclic nitrogen-containing monomers such as pyridine derivatives and quinoline derivatives containing at least one vinyl or alpha methylvinyl group such as 2-vinylpyridine, 3-vinylpyridine, 4-vinylpyridine, 3-ethyl-5-vinylpyridine, 2-methyl-5-vinylpyridine, 3,5-diethyl-4-vinylpyridine, 2-methyl-5-($\alpha$-methylvinyl)pyridine, similar substituted quinolines and isoquinolines, and the like; acrylic acid esters such as methyl acrylate, ethyl acrylate and the like; alkacrylic acid esters such as methyl methacrylate, ethyl methacrylate, propyl methacrylate, ethyl methacrylate, butyl methacrylate and the like; methyl vinyl ether, vinyl chloride, vinylidene chloride, vinylfuran, vinylcarbazole, vinylacetylene, and the like; and monomers containing more than one vinylidene group such as 2,4-divinylpyridine, divinylbenzene, 2,3-divinylpyridine, 3,5-divinylpyridine, 2,4-divinyl-6-methylpyridine, 2,3-divinyl-5ethylpyridine, and the like.

It is most surprising to discover that the addition of a polythiol to a system comprising a diene polymer containing vinyl unsaturation and a free radical generating agent leads to an unexpected and highly significant improvement of the cure, this improvement being far greater than the summation of the effects of the individual components when used alone. The reason for this apparent synergistic effect is unknown. However, it is believed that at least a small amount of vinyl unsaturation in the diene polymer, such as 0.5 percent of the theoretical total unsaturation, preferably 1.0 to 30 percent, is a significant factor in the improvement. Higher amounts, including polymers in which vinyl unsaturation is as much as 100 percent are also operable.

Free radical generating substances that may be employed include organic or inorganic compounds which break down under the influence of heat or friction, and may include peroxides, hydroperoxides, peracids, and combinations with inorganic complex formers. Specific free radical generators include materials heretofore frequently used as polymerization catalysts for polymerization of olefins and olefinic compounds. Organic free radical generators include the following symmetrical peroxides: diacetylperoxide, di-tert-butyl peroxide, diethyl peroxide, dibenzoyl peroxide, dibenzyl peroxide, di-$\alpha,\alpha$-methylbenzylperoxide, di-$\alpha,\alpha$-methylbenzylperoxide, di-$\alpha,\alpha$-methyl-p-methylbenzlperoxide, di-$\alpha,\alpha$-methyl-p-isopropylbenzylperoxide, dicyclohexyl peroxide and dilauroyl peroxide.

Unsymmetrical peroxides useful in the invention include the following compounds: hydroperoxides such as isopropylbenzene hydroperoxide, p-menthane hydroperoxide, tert-butylisopropylbenzene hydroperoxide, diisopropylbenzene hydroperoxide, triisopropylbenzene hydroperoxide, cyclohexylbenzene hydroperoxide, t-butylisopropylbenzene hydroperoxide; peroxides such as benzyl ($\alpha$-methylbenzene) peroxide, benzyl ($\alpha$-methyl-p-methylbenzyl) peroxide, benzyl ($\alpha$-methyl-p-isopropylbenzyl) peroxide, tert-butyl ($\alpha,\alpha$-methylbenzyl) peroxide; per esters such as tert-butyl perbenzoate, amylperacetate, and peracids such as peracetic acid.

Other well known organic free radical yielding materials useful in this invention include the naturally occurring peroxides, such as ascaridole. Other employable free radical formers are the azo compounds such as $\alpha,\alpha$-azobis-(isobutyronitrile), diazoaminobenzene, dichloroazocarbonamidine and the like.

Particularly preferred free radical generating materials include $\alpha,\alpha$-azobis(isobutyronitrile), benzoyl peroxide, and the like.

The temperature employed during the curing of the vulcanizable elastomers containing the free radical generating agent and the polythiol depends on a number of factors. The compounded stock is cured, or vulcanized, at a temperature and for a period of time to provide the optimum state of cure for the particular type of product being fabricated. The desired temperature must take into consideration the temperature required to form free radicals as well as the effect that the temperature has on the polymer so as to prevent polymer degradation. Preferably, the temperature is in the range of 100 to 500° F., more preferably 200 to 400° F. with a preferred cure time of from 5 minutes to 2 hours.

The amount of the polythiol used in conjunction with the free radical generating agent varies depending on the desired final product, the free radical agent, and the polythiol employed as well as the conditions of curing. Usually, it has been found desirable to provide from about 0.02 to 0.6, preferably 0.1 to 0.4, parts by weight of combined mercapto groups in the polythiols per hundred parts of the elastomer. The amount of the free radical generating agent is preferably from about 0.1 to 2.0 parts per hundred parts of rubber. Incorporation can be effected by any suitable method such as by the employment of roll mills, Banbury mixers, and the like.

Plasticizers, antioxidants, extenders, fillers and the like can be employed if desired depending upon the desired physical properties of the cured composition.

Various applications for the composition of this invention include: tires for automotive vehicles, gaskets, shock absorbing elements, household articles, surgical goods, hose, tubing and the like.

The following examples illustrate the compositions prepared according to this invention and a method of preparation but should be considered illustrative and not as limiting the invention.

EXAMPLE I

A combination of azoisobutyronitrile and a liquid mercapto-terminated polybutadiene prepared using the following recipe was employed in the curing of a cis-polybutadiene containing 2.9 percent vinyl unsaturation. The cis-polybutadiene was prepared by the polymerization of 1,3-butadiene in a toluene solution employing an initiator system comprising triisobutylaluminum, titanium tetrachloride and $I_2$. To the cis-polybutadiene was added approximately 0.5 weight percent based on rubber of an antioxidant, 2,2'-methylene-bis(4-methyl-6-tertiary butyl phenol) to prevent oxidation until the rubber was cured by the compounding recipe of this invention.

|   | Parts by weight |
|---|---|
| Butadiene | 100 |
| Water | 200 |
| Potassium fatty acid soap | 5.0 |
| Potassium chloride | 0.5 |
| Tamol N [a] | 0.2 |
| Questex 45W [b] | 0.08 |
| Sodium formaldehyde sulfoxylate dihydrate | 0.135 |
| $FeSO_4 \cdot 7H_2O$ | 0.0375 |
| p-Menthane hydroperoxide | 0.458 |
| Toluene (to dissolve Dixie) | 6.28 |
| Dixie [c] | 6.0 |
| Shortstop: Thiostop N [d] | 0.5 |
| AO-2246 [e] (Shortstop), phr. | 2.0 |
| Polymerization temperature, °F. | 86 |
| Time, hr. | 13.2 |
| Conversion, percent | 60 |

[a] Sodium salt of naphthenic sulfonic acid condensed with formaldehyde.
[b] Tetrasodium salt of ethylenediamine tetracetic acid with 4-molecular water of hydration.
[c] Diisopropyl xanthogen disulfide.
[d] Sodium dimethyldithiocarbamate.
[e] 2,2'-methylene-bis(4-methyl-6-tert-butylphenol).

The latex prepared using this recipe was coagulated with brine-alcohol, the polymer recovered, washed with water, and dried. The dry liquid polymer was dissolved in cyclohexane and treated with hydrazine to hydrolyze the xanthate groups after which the polymer solution was filtered through Dicalite. The solvent was removed by evaporation. The mercapto-terminated polybutadiene contained 1.35 weight percent (SH).

Compounding was done on a 2-inch rubber mill and the stocks were cured between sheets of aluminum foil in a press. The degree of cure is a function of the reciprocal of the swelling ratio ($V_r$) and cured samples were evaluated for stress-strain properties. Data on these runs are shown in Table I.

These data show that the presence of the dimercaptan, which produced no cure alone, together with azoisobutyronitrile increased $V_r$ by 220 percent in gum stocks using only 5 parts dimercaptan and 1 part AIBN (Runs 2 and 6) and as much as 65 percent in black stocks using Philblack A carbon black (Runs 10 and 11). Tensile of gum stocks was more than doubled and in black stocks using Philblack A carbon black was increased about 150 percent (Runs 10 and 11).

EXAMPLE II

In order to determine the effectiveness of the system of the present invention, a series of runs was made using rubbers containing appreciable amounts of vinyl unsaturation and comparing the results with those obtained when using the same polymers were used:

Table II

| Polymer No. | Vinyl-Containing | Vinyl (approx. percent) | No Vinyl Groups |
|---|---|---|---|
| 1 | | | Natural Rubber.[a] |
| 2 | | | Butyl Rubber.[b] |
| 3 | Polybutadiene (Li Catalyzed). | 8 | |
| 4 | Butadiene-Styrene Block Polymer. | 8 | |
| 5 | Butadiene-Styrene Copolymers [c]. | 18 | |
| 6 | Butadiene-Styrene Copolymers [d]. | 18 | |

[a] No. 1 Smoked Sheet.
[b] GRI-18.
[c] Philprene 1500 Rubber—Butadiene-styrene rubber, emulsion polymerized at 41° F., non-pigmented—approx. 24% bound styrene.
[d] Philprene 1712 Rubber—Oil extended butadiene-styrene rubber—approx. 24% bound styrene.

These rubbers were compounded using α,α-azobis-(isobutyronitrile) and a mercapto-terminated liquid poly-

Table I

CURE OF CIS-POLYBUTADIENE [a] AT 250° F.

| Run No. | Black (50 phr.)* | Time (min.) | AIBN [b] (phr.)* | Di-SH [c] (phr.)* | 300% Mod. (p.s.i.) | Tensile [1] (p.s.i.) | Elong.,[1] percent | $V_r$ [2] |
|---|---|---|---|---|---|---|---|---|
| 1 | | 60 | | 10 | Did Not Cure | | | |
| 2 | | 60 | 1 | | 50 | 175 | 900 | 0.068 |
| 3 | | 60 | 2 | | 70 | 230 | 1,040 | |
| 4 | | 60 | 0.5 | 5 | 120 | 300 | 840 | 0.165 |
| 5 | | 60 | 0.5 | 10 | 110 | 280 | 920 | |
| 6 | | 60 | 1 | 5 | 150 | 360 | 790 | 0.218 |
| 7 | | 60 | 1 | 10 | 220 | 390 | 600 | 0.267 |
| 8 | | 60 | 2 | 10 | 290 | 400 | 490 | 0.280 |
| 9 | | 60 | 2 | 20 | 250 | 280 | 360 | 0.303 |
| 10 | PBA [d] | 60 | 1 | | 230 | 740 | 670 | 0.170 |
| 11 | PBA [d] | 60 | 1 | 10 | 660 | 1,840 | 620 | 0.280 |
| 12 | PBO [e] | 20 | 1 | | 245 | 590 | 585 | 0.184 |
| 13 | PBO [e] | 60 | 1 | | 275 | 740 | 620 | 0.184 |
| 14 | PBO [e] | 20 | 1 | 10 | 540 | 1,590 | 590 | 0.265 |
| 15 | PBO [e] | 60 | 1 | 10 | 600 | 1,500 | 560 | 0.263 |

[a] Microstructure:[3]
  cis- ........................................................................... 95.5%
  trans- ......................................................................... 1.6%
  Vinyl .......................................................................... 2.9%
[b] α,α-azobis-(isobutyronitrile).
[c] Mercapto-terminated liquid polybutadiene (1.35 weight percent SH).
[d] Philblack A carbon black—fast extrusion furnace black.
[e] Philblack O carbon black—high abrasion furnace black.
[1] ASTM D-421-51T. Instron tensile machine. Tests made at 80° F.
[2] Reciprocal of the swelling ratio—determined by the method of Kraus, Rubber World, October 1956.
[3] The polymer samples were dissolved in carbon disulfide so as to form a solution having 25 grams of polymer per liter of solution. The infrared spectrum of each of the solutions (percent transmission) was then determined in a commercial infrared spectrometer.
The percent of the total unsaturation present in trans-1,4- was calculated according to the following equation and consistent units:

$$\epsilon = \frac{E}{tc}$$

where $\epsilon$=extinction coefficient (liters-mols$^{-1}$-centimeters$^{-1}$); $E$=extinction (log $I_0/I$); $t$=path length (centimeters); and $c$=concentration (mols double bond/liter). The extinction was determined at the 10.35 micron band and the extinction coefficient was 146 (liters-mols$^{-1}$-centimeters$^{-1}$).

*Parts per hundred parts of cis-polybutadiene by weight.
The percent of the total unsaturation present as 1,2- (or vinyl) was calculated according to the above equation, using the 11.0 micron band and an extinction coefficient of 209 (liters-mols$^{-1}$-centimeters$^{-1}$).
The percent of the total unsaturation present as cis-1,4- was obtained by substracting the trans-1,4- and 1,2- (vinyl) determined according to the above procedure from the theoretical unsaturation, assuming one double bond per each $C_4$ unit in the polymer.

butadiene (same as that used in Example I). Compounding was on a 2-inch rubber mill and all stocks were cured 1 hour at 250° F. between sheets of aluminum foil on a press. Where cure was effected, stress strain properties were obtained. Data obtained in these runs are shown in Table III.

*Table III*

| Polymer No. (Table II) | AIBN (phr.) | DiSH (phr.) | 300% Mod.[1] (p.s.i.) | Tensile[1] (p.s.i.) | Elongation[1] (percent) |
|---|---|---|---|---|---|
| 3 | 1 | ------ | ------ | Undercured | |
| 3 | 1 | 10 | 180 | 240 | 490 |
| 4 | 1 | ------ | ------ | 85 | 160 |
| 4 | 1 | 10 | 190 | 400 | 640 |
| 5 | 1 | ------ | 110 | 220 | 720 |
| 5 | 1 | 10 | 250 | 650 | 710 |
| 6 | 1 | ------ | 60 | 110 | 770 |
| 6 | 1 | 10 | 200 | 280 | 460 |
| 1 | 1 | ------ | | Undercured | |
| 1 | 1 | 10 | | Undercured | |
| 2 | 1 | ------ | | Undercured | |
| 2 | 1 | 10 | | Undercured | |

[1] See Example I.

These data show that the rubbers containing no vinyl unsaturation failed to cure under the conditions used. They also show that physical properties were significantly improved by the inclusion of the dimercapto-polybutadiene over those of polymers cured by α,α-azobis-(isobutyronitrile) alone.

EXAMPLE III

A series of runs was made to demonstrate the utility of another dithiol (1,10-dimercaptodecane) and to compare the results obtained using this compound with those using the dimercaptopolybutadiene employed in the runs of Examples I and II. In these runs the rubber used was cis-polybutadiene (same as used in Example I). Cure was at 250° F. for 1 hour. Data are shown in Table IV.

*Table IV*

| AIBN (phr.) | DiSH #1 [a] (phr.) | DiSH #2 [b] (phr.) | PBO [c] (phr.) | 300% Mod.[1] (p.s.i.) | Tensile[1] (p.s.i.) | Elong.[1] (percent) | $V_r$[2] |
|---|---|---|---|---|---|---|---|
| 1 | ------ | ------ | ------ | 35 | 70 | 100 | (d) |
| 1 | 10 | ------ | ------ | 180 | 270 | 500 | 0.263 |
| 1 | ------ | [e] 0.4 | ------ | 180 | 250 | 500 | 0.297 |
| 1 | ------ | ------ | 50 | 250 | 670 | 690 | 0.197 |
| 1 | 10 | ------ | 50 | 480 | 1,440 | 680 | 0.262 |
| 1 | ------ | 0.4 | 50 | 620 | 1,610 | 600 | 0.303 |

[a] Mercapto-terminated liquid polybutadiene (1.35% SH).
[b] 1,10-dimercaptodecane.
[c] Philblack O carbon black—High abrasion furnace black.
[d] Sample dissolved. No cure.
[e] Equivalent to 10 phr. of mercapto-terminated polybutadiene.
[1][2] See Example I.

These data demonstrate that 1,10-dimercaptodecane, when present is an equivalent amount based on mercapto groups, is about equal in curing effect to the mercapto-terminated liquid polybutadiene. The advantage of the invention is also determined by comparison with the control data shown.

While certain examples, structures, composition and process steps have been described for purposes of illustration, the invention is not limited to these. Variations and modification within the scope of the disclosure and the claims can readily be effected by those skilled in the art.

I claim:
1. A cured elastomeric composition which comprises, prior to vulcanizing, (1) a solid vulcanizable elastomer containing at least 0.5 percent vinyl unsaturation selected from the group consisting of homopolymers of conjugated dienes having from 4 to 12 carbon atoms per molecule and copolymers of said conjugated dienes with a copolymerizable monomer containing a $CH_2=C<$ group, (2) a free radical generating compound selected from the group consisting of peroxides, hydroperoxides, peracids, per esters, azo compounds and combinations thereof with inorganic complex formers present in an amount in the range between 0.1 to 2.0 parts per 100 parts by weight of elastomer, and (3) a mercapto-terminated liquid polymer of a conjugated diene having from 4 to 12 carbon atoms per molecule present in an amount in the range between 0.02 to about 0.6 part by weight of the combined mercaptan groups per 100 parts of said elastomer.

2. The composition of claim 1 wherein said vulcanizable elastomer is polybutadiene.

3. A cured elastomeric composition according to claim 1 wherein the free radical generating compound is α,α-azobis-(isobutyronitrile).

4. A process for curing a vulcanizable elastomer containing from 0.5 to 100 percent vinyl unsaturation selected from the group consisting of homopolymers of conjugated dienes having from 4 to 12 carbon atoms per molecule and copolymers of said conjugated dienes with a copolymerizable monomer containing a $CH_2=C<$ group comprising intimately admixing therewith (1) a free radical generating compound selected from the group consisting of peroxides, hydroperoxides, peracids, per esters, azo compounds and combinations thereof with inorganic complex formers present in an amount in the range between 0.1 to 2.0 parts per 100 parts by weight of elastomer and (2) a mercapto-terminated liquid polymer of a conjugated diene having from 4 to 12 carbon atoms per molecule present in an amount in the range between 0.02 to about 0.6 part by weight of the combined mercaptan groups per 100 parts of said elastomer, and subjecting same to a temperature in the range of 100° to 500° F. for a period of time in the range of 5 minutes to 2 hours.

5. The process of claim 4 wherein said vulcanizable elastomer is polybutadiene.

6. A process according to claim 4 wherein said free radical generating agent is α,α-azobis-(isobutyronitrile).

References Cited by the Examiner
UNITED STATES PATENTS

| | | | |
|---|---|---|---|
| 2,583,975 | 1/1952 | Tawney | 260—79.5 |
| 2,845,411 | 7/1958 | Willis | 260—94.7 |
| 2,925,407 | 2/1960 | Goldberg | 260—94.7 |
| 2,964,502 | 12/1960 | Wheelock | 260—94.7 |
| 3,108,994 | 10/1963 | Zelinski et al. | 260—94.7 |

MURRAY TILLMAN, *Primary Examiner.*

LEON J. BERCOVITZ, *Examiner.*